United States Patent [19]
Okada

[11] Patent Number: 4,773,588
[45] Date of Patent: Sep. 27, 1988

[54] HEATER DEVICE FOR MOTOR VEHICLE
[75] Inventor: Masaki Okada, Yokohama, Japan
[73] Assignee: Isuzu Motors Limited, Tokyo, Japan
[21] Appl. No.: 138,397
[22] Filed: Dec. 28, 1987
[30] Foreign Application Priority Data
Dec. 27, 1986 [JP] Japan ................................ 61-315281
[51] Int. Cl.$^4$ ............................................. G05D 23/00
[52] U.S. Cl. ................................ 237/2 A; 237/12.3 C
[58] Field of Search ............. 237/2 A, 12.3 R, 12.3 C; 165/41; 62/236; 236/47

[56]  References Cited
U.S. PATENT DOCUMENTS
4,519,772  5/1985  Mittmann ....................... 237/12.3 C Primary Examiner—Henry Bennett
Attorney, Agent, or Firm—Staas & Halsey

[57]  ABSTRACT

A vehicle heater device for a motor vehicle has a burner for combusting fuel and a heat exchanger for heating warming air to be introduced into a passenger compartment with a combustion gas produced by the burner. The heater device also has a timer for setting an operation starting time and an operation time period for the heater device. If the remaining capacity of a battery used as a power supply for the heater device and the amount of remaining fuel to be supplied to the burner are equal to or greater than prescribed levels, the heater device is operated at the time set by the timer.

4 Claims, 4 Drawing Sheets

HEATER DEVICE FOR MOTOR VEHICLE

BACKGROUND OF THE INVENTION

The present invention relates to a heater device for heating the passenger compartment of a motor vehicle.

The passenger compartment or cabin of a motor vehicle is generally heated by a heat source employing the cooling water of the internal combustion engine on the motor vehicle.

However, in cold weather, it takes time to increase the temperature of the cooling water, and hence the compartment cannot be heated quickly.

Japanese Laid-Open Patent Publication No. 61-157422 discloses a vehicle heater device in which fuel is combusted by a burner separate from the internal combustion engine and heat generated by the fuel combustion is recovered by a heat exchanger to supply heating air into the compartment.

The disclosed vehicle heater device can produce warm air in the compartment in cold weather. However, since the heater device is manually started by the driver, the driver still feels uncomfortable when getting into the compartment which is not yet warmed.

There is a strong demand in recent years for comfortable passenger compartments or cabins of motor vehicles, and hence a vehicle heater device which warms the passenger compartment before the driver gets into the motor vehicle.

SUMMARY OF THE INVENTION

It is an object of the present invention to provide a vehicle heater device capable of automatically operating a heater to warm the passenger compartment of a motor vehicle.

According to the present invention, there is provided a vehicle heater device comprising a burner for combusting fuel, a heat exchanger for heating warming air to be introduced into a passenger compartment with a combustion gas produced by the burner, a controller for controlling operation of the burner, a timer for setting an operation starting time and an operation time period for the heater device, means for detecting the remaining capacity of a battery serving as a power supply for the heater device, means for detecting the amount of remaining fuel in a fuel tank which stores fuel to be supplied to the burner, and means for turning on the battery at the operating starting time set by the timer when the remaining capacity of the battery and the amount of remaining fuel in the fuel tank, as detected by signals from the detecting means, are higher than prescribed levels.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
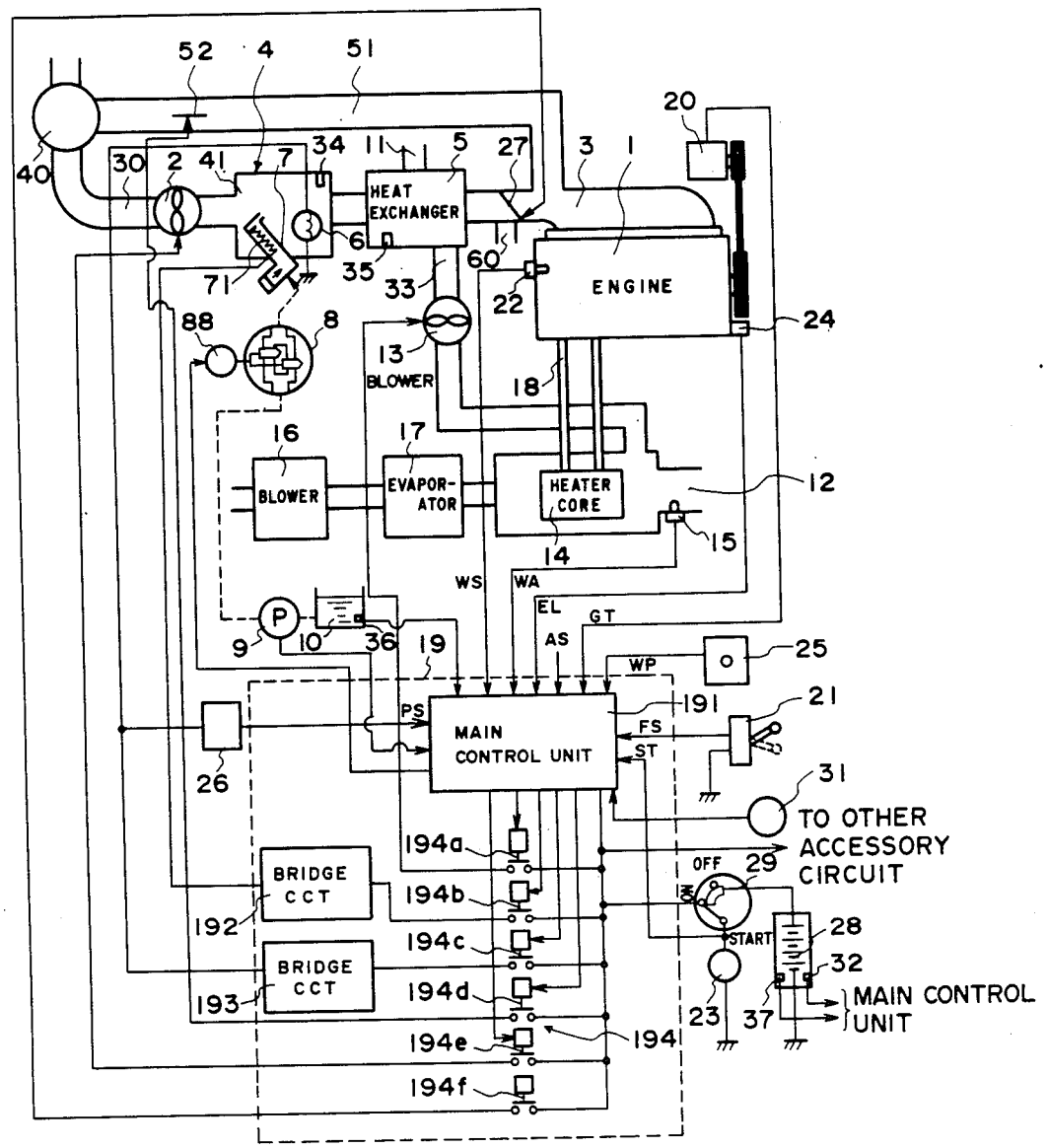
FIG. 1 is a block diagram of a heater device for a motor vehicle according to an embodiment of the present invention.

As shown in FIG. 1, an internal combustion engine 1 such as a diesel engine or a gasoline engine has an intake pipe 3 connected to an air cleaner 40 through an air duct 30. In the air duct 30, there are disposed a combusting blower 2, a burner 4 positioned downstream of the blower 2, and a heat exchanger 5 positioned downstream of the burner 4.

The air duct 30 is bypassed by a bypass pipe 51 which directly introduces air from the air cleaner 2 via the intake pipe 3 to the internal combustion engine 1. The bypass pipe 51 has a control valve 52 controlled by controller 19 (described later).

The burner 4 has a combustion chamber 41, a fuel atomizer 7 inclined such that it extends from the bottom of the combustion chamber 41 near an outlet thereof toward the center of the combustion chamber 41, and an igniting glow plug 6 disposed in the combustion chamber 41 for igniting fuel atomized by the fuel atomizer 7. The fuel atomizer 7 houses therein an atomizing glow plug 71 in the form of a pipe or a rod made of a ceramic material such as silicon nitride ($Si_3N_4$) for heating and atomizing fuel. The atomizing glow plug 71 has a resistance wire of a positive temperature coefficient which is embedded centrally therein.

The igniting glow plug 6 is in the form of a rod made of a ceramic material such as silicon nitride ($Si_3N_4$) and has a centrally embedded resistance wire. The igniting glow plug 6 can be heated by energizing the resistance wire.

A fuel supply device 8 supplies fuel fed from a fuel pump 9 and is actuated by a driver 88 controlled by the controller 19.

The fuel supplied from the fuel supply device 8 to the fuel atomizer 7 is heated and atomized by the atomizing glow plug 71 into atomized fuel which is ejected into the combustion chamber 41. The atomized fuel is mixed with air introduced into the combustion chamber 41 by the combustion blower 2 to produce a combustible air-fuel mixture. The combustible air-fuel mixture in the combustion chamber 41 is ignited by the energized igniting glow plug 6 to produce flames and high-temperature gases which are delivered to the downstream heat exchanger 5.

The combustion gases that have passed through the heat exchanger 5 are then delivered via the intake pipe 3 to the internal combustion engine 1 or via a discharge pipe 60 to an exhaust pipe (not shown) of the internal combustion engine 1, dependent on the position of a directional control valve 27 controlled by the controller 19.

The heat exchanger 5 draws fresh air from an air inlet 11 communicating with the passenger compartment of the motor vehicle to be heated and transfers heat from the combustion gases to the fresh air. The hot air heated by the heat exchanger 5 is discharged by a heating air blower 13 through an outlet 12 into the passenger compartment.

The outlet 12 is open at the exist of a cooling water heater core 14 which is separately provided for heating the passenger compartment. A hot air temperature sensor 15 is disposed in the exit of the heater core 14 for detecting the temperature of the hot air discharged from the exit. An air blower 16, an air conditioning evaporator 17, and a hot water passage 18 are components of an air conditioning unit which utilizes the engine cooling water.

The controller 19 comprises a main control unit 191 which is supplied with a rotation signal GT from a generator 20 driven by the engine 1, an ON/OFF signal FS from an actuating switch 21, a water temperature signal WS from a water temperature switch 22 which detects the temperature of the cooling water for the engine 1, a start position signal ST for operating a starter motor 23, an accelerator opening signal AS, a load signal EL from an engine load sensor 24 which detects the load condition of the engine 1, a hot air temperature signal WA from the hot air temperature sensor 15 at the outlet 12, a heating signal WP from a heating position switch 25 operated by the driver, and a plug temperature signal PS from an igniting plug sensor 26 which detects the temperature of the igniting glow plug 6. The controller 19 also includes a bridge circuit 192 for controlling the atomizing glow plug 71 of the fuel atomizer 7 so that it is heated to the temperature for atomizing the fuel, a bridge circuit 193 for controlling the igniting glow plug 6 so that it is heated to the temperature for igniting the mixture of the atomized fuel and air, and a switch assembly 194.

The main control unit 191 is in the form of a computer having a processor, memories, and an input/output interface.

The bridge circuit 192 comprises a Wheatstone bridge having the resistance wire for heating the atomizing glow plug 71 as one branch and three other resistance wires as other branches, a comparator for detecting the balanced condition of the Wheatstone bridge, and a relay actuatable by an output from the comparator. The relay turns on and off the resistance wire to heat the atomizing glow plug 71 to the fuel atomizing temperature, e.g., about 500° C. The bridge circuit 193 comprises a Wheatstone bridge having the resistance wire for heating the igniting glow plug 6 as one branch and three other resistance wires as other branches, a comparator for detecting the balanced condition of the Wheatstone bridge, and a relay actuatable by an output from the comparator. The relay turns on and off the resistance wire to heat the igniting glow plug 6 to the temperature for igniting the mixture of the atomized fuel and air.

The switch assembly 194 has a switch 194a for controlling the supply of electric power to the bridge circuit 192, a switch 194c for controlling the supply of electric power to the bridge circuit 193, a switch 194d for controlling the bypass valve 52 in the air duct 30, a switch 194e for controlling the supply of electric power to the combusting blower 2, and a switch 194f for controlling the directional control valve 27. Denoted at 28 is a power supply battery, and 29 a key switch.

The actuating switch 21 is used for operating a quick heater device and applies an ON signal to operate the heater device. When a timer 31 (described later on) is set, only the quick heater device is controlled so as to be operated independently of the engine.

A float-type sensor 36 serves to detect the amount of remaining fuel in the fuel tank 10. A timer 31 sets an operation start time and an operation time period for the quick heater device, as desired by the driver. The density of the electrolyte of a battery 28 is detected by a liquid temperature senso 32. The specific gravity of the electrolyte of the battery 28 is detected by a specific gravity sensor 37. Detected signals from these sensors are sent to the main control unit 191.

An overheat sensor 34 is provided for preventing the burner 4 from being overheated. Another overheat sensor 35 is provided for preventing the heat exchanger 5 from being overheated. Signals from these sensors are applied to the main control unit 191 through respective signal lines which are omitted from illustration for the sake of brevity.

A control sequence of the present invention will now be described with reference to the flowcharts of FIGS. 2 and 3.

Figure 2:
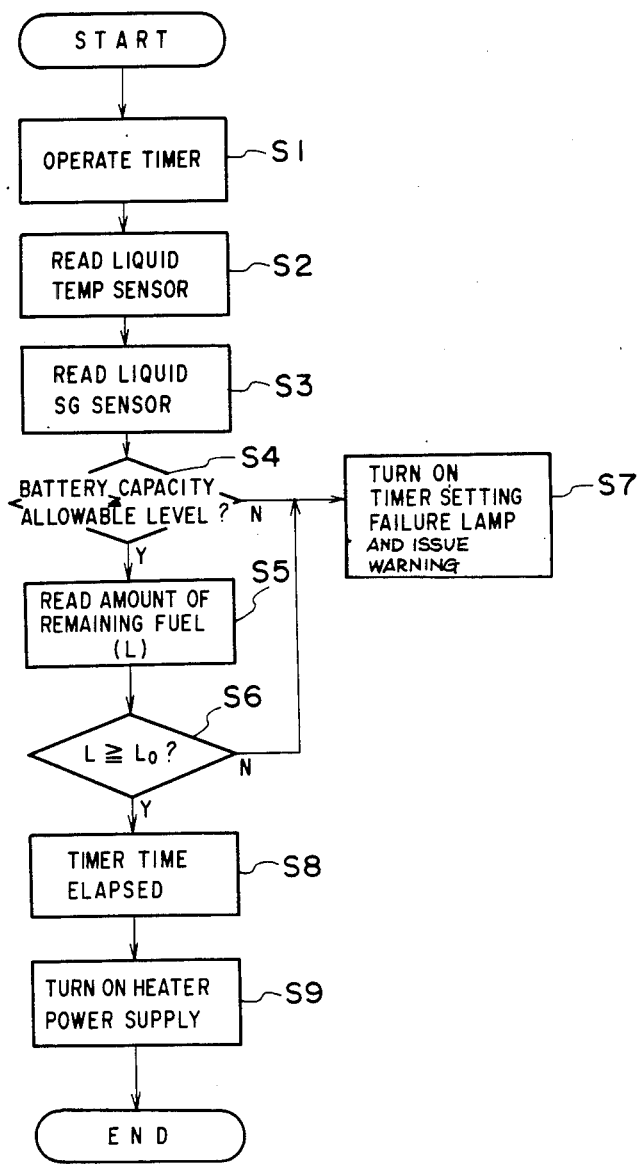
FIGS. 2 and 3 are flowcharts of a control sequence of the heater device.
Figure 3:
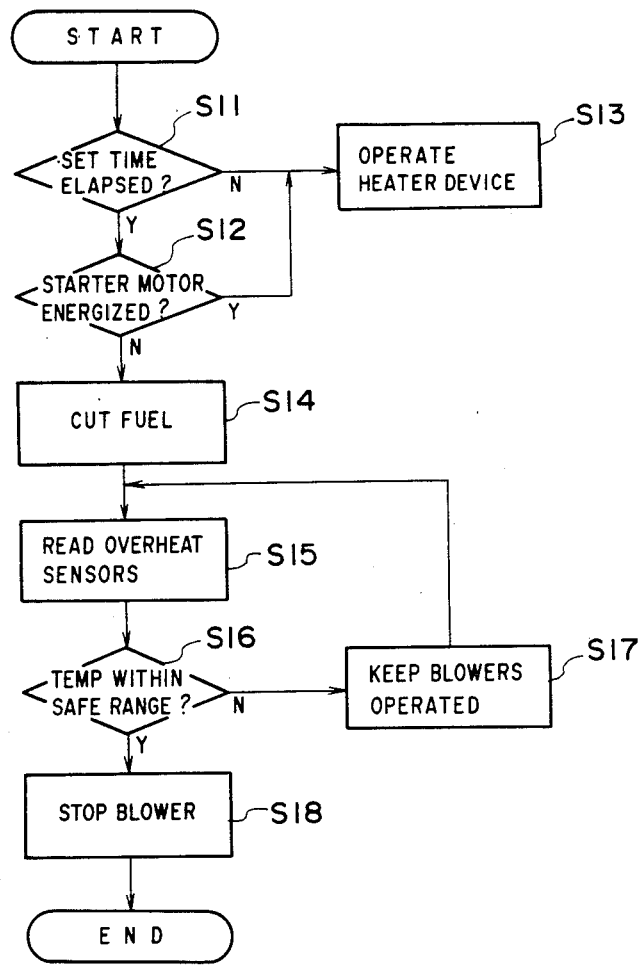
Figure 4:
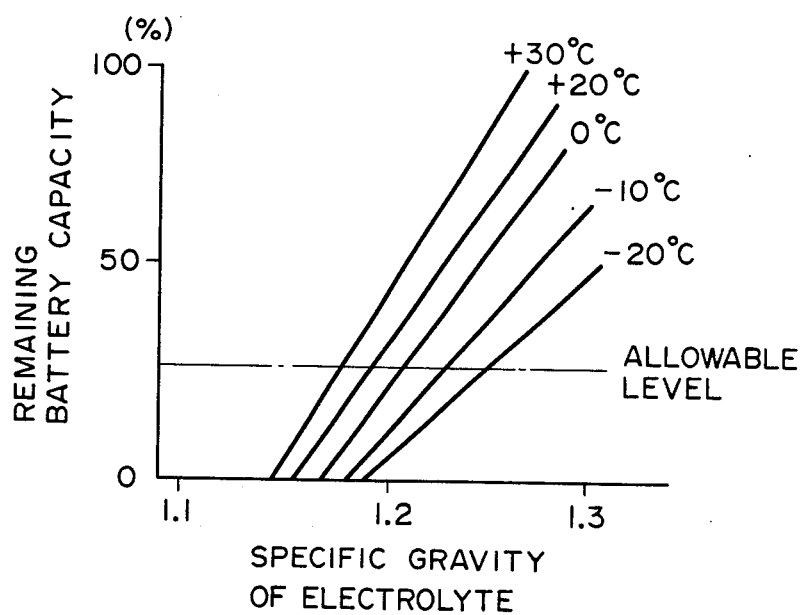
FIG. 4 is a grape showing a control map for defining an allowable level for the remaining capacity of a battery.

In FIG. 2, the timer 31 is operated by the driver in a step S1 for setting an operation starting time and an operation time period for the quick heater device as desired by the driver. Then, detected values of the temperature sensor 32 and the specific gravity sensor 37 are read in steps S2, S3. A step S4 checks the remaining capacity of the battery with respect to an allowable level based on the sensor signals. More specifically, as shown in FIG. 4, a control map in the memory in the main control unit 191 stores remaining battery capacities versus specific gravities of the battery electrolyte for respective electrolyte temperatures, the control map defining the allowable level. Whether or not the remaining capacity of the battery is equal to or higher than the allowable level is determined on the basis of the temperature and specific gravity of the battery electrolyte which have been read in step S2, S3.

If the remaining capacity of the battery is equal to or higher than the allowable level in the step S4, then the value (L), indicating the amount of remaining fuel, of the fuel sensor 36 is read in a step S5. A step S6 ascertains whether or not the amount (L) of remaining fuel in the fuel tank 10 is equal to or higher than a prescribed level ($L_0$).

If the remaining capacity of the battery is lower than the allowable level in the step S4, or if the amount (L) of remaining fuel is lower than the prescribed level ($L_0$), then a timer setting failure lamp is turned on and a warning is issued in a step S7 to invite the driver to reset the timer.

Upon elapse of the starting time for the timer in a step S8, the power supply of the heater device is switched to operate the heater device independently of the operation of the engine in a step S9.

Control subsequent to the operation of the heater device will be described with reference to FIG. 3.

First, in a step S11 whether the time period (operation time period) set by the timer 31 has elapsed or is not ascertained, and then in a step S12 it is ascertained whether the starter motor 23 is energized or not. If the set time period has not yet elapsed or the starter motor 23 is energized, then the heater device is actuated normally in a step S13.

If the starter motor 23 is not energized after the set time period has elapsed, then the fuel from the fuel pump 9 is cut off in a step S14, and thereafter the temperature signals from the overheat sensors 34, 35 are read in a step S15. In a step S16 it is determned whether the temperatures detected by the overbeat sensors 34, 35 are within a safe range or not. If within the safe range, then the blower 13 is stopped in a step S18. If not within the safe range, then the combustion blower 2 and the heating air blower 13 are continuously operated in order to suppress a temporary rise of the temperatures of the burner 4 and the heat exchanger 5 in a step S17.

With the present invention, as described above, operation of the vehicle heater device is controlled by setting the timer. By previously setting the timer to a desired time for the driver to drive the vehicle, the passenger compartment of the vehicle can be warmed in advance. Therefore, the driver can get into the warm passenger compartment when starting to drive the vehicle. The heater device can also be operated for a desired time interval by setting the timer when the driver wants to sleep in the passenger compartment while shutting off the engine.

Although a certain preferred embodiment has been shown and described, it should be understood that many changes and modifications may be made therein without departing from the scope of the appended claims.

What I claim is:

1. A heater device for a motor vehicle having a fuel tank, a passenger compartment and a battery, comprising:
    a burner for combusting fuel to produce a combustion gas;
    a heat exchanger for heating warming air to be introduced into the passenger compartment of the motor vehicle, with the combustion gas produced by the burner;
    a controller for controlling operation of said burner;
    a timer for setting an operation starting time and an operation time period for the heater device;
    means for detecting the remaining capacity of the battery which serves as a power supply for the heater device and for providing a battery capacity signal;
    means for detecting the amount of remaining fuel in the fuel tank which stores fuel to be supplied to said burner and for generating a fuel supply signal; and
    means for turning on said burner at the operation starting time set by said timer when the remaining capacity of the battery and the amount of remaining fuel in the fuel tank, as indicated by the battery capacity signal and the fuel supply signal, are higher than prescribed levels.

2. A heater device for a motor vehicle having a fuel tank, a passenger compartment and a battery, comprising:
    a burner for combusting fuel to produce a combustion gas;
    a heat exchanger for heating warming air to be introduced into the passenger compartment of the motor vehicle, with the combustion gas produced by the burner;
    a controller for controlling operation of said burner;
    a timer for setting an operation starting time and an operation time period for the heater device;
    means for detecting the remaining capacity of the battery which serves as a power supply for the heater device and for providing a battery capacity signal;
    means for detecting the amount of remaining fuel in the fuel tank which stores fuel to be supplied to said burner and for generating a fuel supply signal; and
    means for turning on said burner at the operation starting time set by said timer when the remaining capacity of the battery and the amount of remaining fuel in the fuel tank, as indicated by the battery capacity signal and the fuel supply signal, are higher than prescribed levels; and
    means responsive to the battery capacity signal and the fuel supply signal, for issuing a warning when said timer is set if the remaining capacity of the battery or the amount of remaining fuel in the fuel tank is smaller than the prescibed levels.

3. A heater device according to claim 1, wherein said means for detecting the remaining capacity of the battery comprises a sensor for detecting the temperature of the electrolyte of the battery and a sensor for detecting the specific gravity of the electrolyte of the battery.

4. A heater device according to claim 2, wherein said means for detecting the remaining capacity of the battery comprises a sensor for detecting the temperature of the electrolyte of the battery and a sensor for detecting the specific gravity of the electrolyte of the battery.

* * * * *

UNITED STATES PATENT AND TRADEMARK OFFICE
CERTIFICATE OF CORRECTION

PATENT NO. : 4,773,588
DATED : SEPTEMBER 27, 1988
INVENTOR(S) : MASAKI OKADA

It is certified that error appears in the above-identified patent and that said Letters Patent is hereby corrected as shown below:

Col. 2, line 1, "grape" should be --graph--;
line 64, "exist" should be --exit--.

Col. 3, line 48, after "for" insert --turning on and off the heating blower 13, a switch 194b for--;
line 67, "senso" should be --sensor--.

Col. 4, line 30, "step" should be --steps--;
line 50, change "S11" to --S11,--;
line 51, "is not" should be --not is--;
line 62, "overbeat" should be --overheat--.

Signed and Sealed this

Seventh Day of February, 1989

Attest:

DONALD J. QUIGG

*Attesting Officer*  *Commissioner of Patents and Trademarks*